July 31, 1956
C. R. HEAD
2,757,056
CYLINDER LINER ASSEMBLY FOR PUMPS
AND PACKING MEANS THEREFOR
Filed Feb. 23, 1954
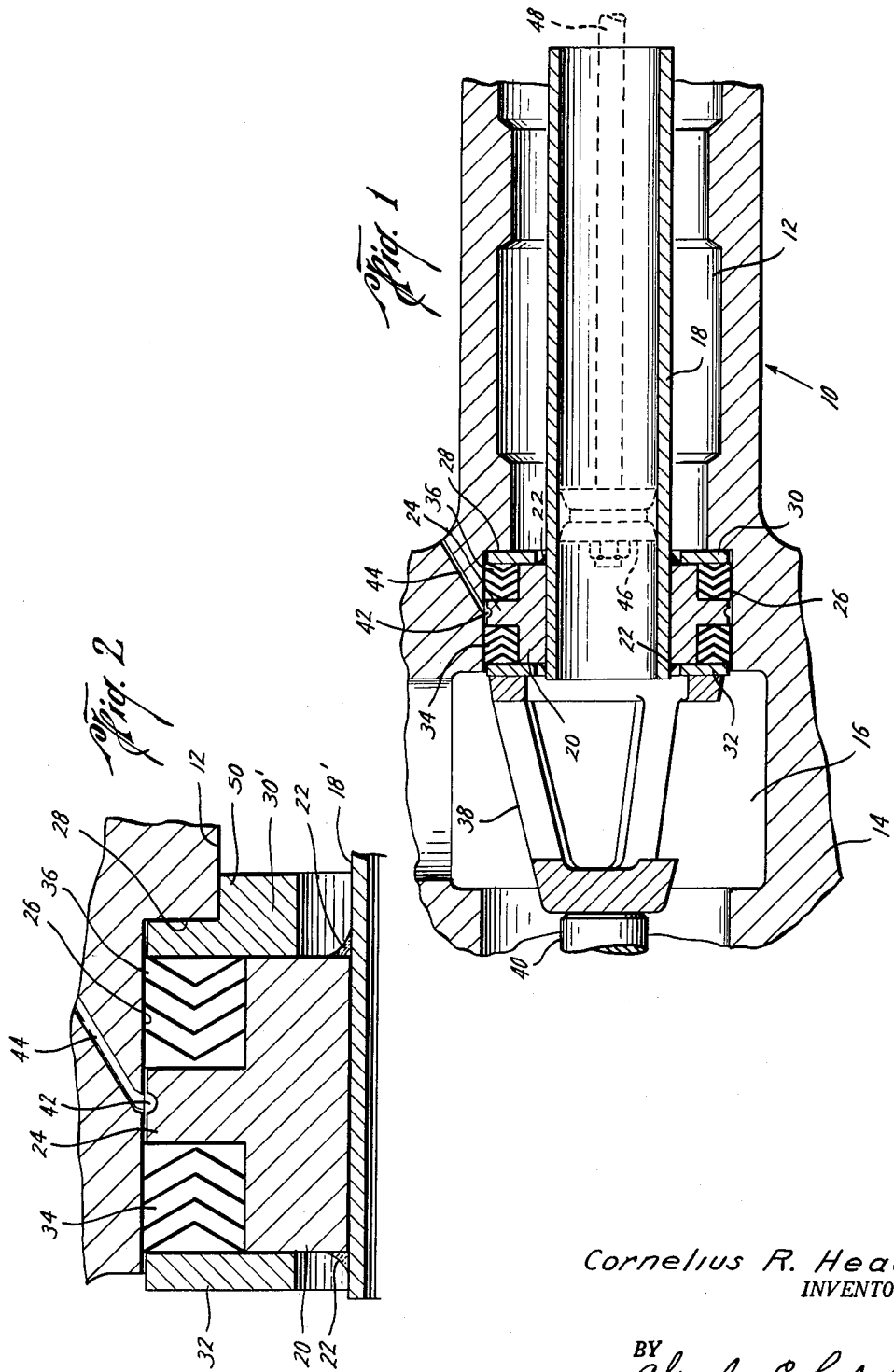
Cornelius R. Head
INVENTOR.
BY Charles E. Lightfoot
ATTORNEY

United States Patent Office 2,757,056
Patented July 31, 1956

2,757,056

CYLINDER LINER ASSEMBLY FOR PUMPS AND PACKING MEANS THEREFOR

Cornelius R. Head, Kemah, Tex., assignor of one-third to Raymond P. Glover and one-sixth to Benjamin H. Busby, La Fayette, La.

Application February 23, 1954, Serial No. 411,919

3 Claims. (Cl. 309—3)

This invention relates to a cylinder liner assembly for pumps and packing means therefor, and more particularly to a removable liner for pump cylinders and improved sealing means for the same.

In pump cylinder assemblies of conventional design, as heretofore commonly constructed, it has been customary to employ open-ended cylinder liners having an externally enlarged portion at one end, which is engageable with packing means to compress the packing into sealing contact with the pump cylinder to form a fluid tight seal between the liner and cylinder. Such liners are customarily retained in the cylinder by a spacing cage, which is carried by the cylinder head and engages the end of the liner and by which the liner may be forced against the packing, through which the liner extends so that the liner is capable of slight longitudinal movement relative to the packing.

During the operation of a pump assembly of the type referred to above, there is a slight longitudinal movement of the liner in the packing as the piston of the pump reciprocates in the liner, which gradually increases with time, thus causing the packing to become worn and making necessary expensive replacements and repairs.

The present invention has for its principal object the provision of a pump cylinder liner assembly in which the above mentioned difficulties are overcome, and in which means is provided for preventing longitudinal movement of the liner in the pump cylinder and for forming a fluid tight seal between the liner and cylinder without the application of external mechanical pressure on the packing means employed.

Another object of the invention is to provide a pump cylinder liner assembly having packing means which is self sealing and which does not require the application of external mechanical pressure thereto to maintain a fluid tight seal between the parts.

A further object of the invention is the provision of a pump cylinder liner assembly in which metal to metal contact is maintained between the liner and the pump cylinder, and betwen the liner and the securing means therefor, whereby the liner is securely held against movement in the cylinder, and relative movement between the liner and the packing means employed is prevented.

Another object of the invention is to provide an improved packing assembly for pump cylinder liners wherein the packing is self sealing under the pressure of the fluid being pumped and does not require the application of external mechanical pressure to accomplish a fluid tight seal.

A further object of the invention is the provision of an improved sealing and tell-tale packing arrangement for pump cylinder liner assemblies.

The above and other important objects and advantages of the invention will best be understood from the following detailed description constituting a specification of the same, when considered in conjunction with the annexed drawings, wherein—

Figure 1 is a fragmentary, central, cross-sectional view of a pump cylinder and liner assembly, illustrating a preferred form of the invention; and Figure 2 is a fragmentary detail view, on an enlarged scale, showing details of construction of the packing assembly of a somewhat modified form of the invention.

Referring now to the drawings in greater detail, the invention is illustrated in connection with a fluid pump of conventional design, having a body, generally indicated at 10, which is formed with a cylinder 12, and a head portion 14, having a fluid passageway 16, into which the cylinder 12 opens at one end. The pump is provided with valve mechanism of conventional design, not shown, whereby the pumping of fluid through the passageway 16 by operation of the pump is controlled.

Within the cylinder 12 a cylinder liner 18 is positioned, which liner may be open at its opposite ends, and is provided with an external annular enlargement 20 or head adjacent one end, which enlargement may conveniently take the form of a ring fitted about the liner and secured thereto in any convenient manner, as by welding, as indicated at 22, the ring being formed with an external annular projection 24, mediate its ends.

The body 10 is formed with an enlarged counterbore 26 at one end of the cylinder 10, which is adapted to receive the external enlargement or head 20 of the liner, when the liner is in position in the cylinder, the bottom of said counterbore forming an internal annular shoulder 28, against which an inner junk ring 30 is adapted to be seated, which junk ring preferably has an internal diameter somewhat larger than the external diameter of the liner. An outer junk ring 32 is also provided, which is similar to the inner junk ring, and fits into the counterbore 26, in engagement with the outer end of the enlargement 20 of the liner.

Between the external annular projection 24 and the inner and outer junk rings 30 and 32, suitable packing, such as that indicated at 34 and 36 is positioned, surrounding the ring portion of the enlargement 20, and forming a fluid tight seal between the same and the inner wall of the counterbore 26. The packing 34 and 36 may be of the chevron or other convenient type, which is designed to expand under the pressure of fluid in the pump to form a fluid tight seal between the enlargement of the liner and the wall of the counterbore.

The liner 18 is adapted to be retained in position in the cylinder by means of a spacing cage 38, of conventional design, which is engageable at its inner end with the outer junk ring 32, and at its outer end is engaged by a securing element 40, carried by the head portion 14, and adjustable to apply an endwise force to the enlargement 20 of the liner through the outer junk ring to securely hold the liner in position in the cylinder. It will be apparent that due to the metal to metal contact between the parts, the junk rings and the enlargement 20 will be firmly held in position in the counterbore 26 so that no external mechanical compressive force is applied to the packing 34 and 36, while at the same time the packing is securely retained in the counterbore, and the liner is held against longitudinal movement relative to the packing.

The external annular projection 24 is formed with an external groove 42, and the body 10 is provided with a passageway 44, opening at one end into the counterbore 26 opposite the groove 42 and at its other end exteriorly of the body. This arrangement comprises a tell-tale device whereby fluid which may leak past the packing from the interior of the pump will pass into the groove 42 and out through the passageway 44, so that such leakage can be observed from the outside of the pump.

A pump piston 46, of conventional design is disposed within the liner 18, which piston is connected to a piston rod 48, adapted to be operated in the usual manner from the customary driving mechanism. In the operation of the pump, it will be apparent that the piston 46 may reciprocate in the liner 18 without longitudinal movement of the liner, so that the liner remains stationary with relation to the packing 34 and 36, whereby wear on the packing is substantially eliminated. The pressure of fluid within the cylinder 12 may pass the inner junk ring and enter the counterbore 26 to expand the packing 36 into fluid tight engagement with the enlargement 20 and the wall of the counterbore, and fluid under pressure in the passageway 16 may also pass the outer junk ring 32 and enter the counterbore to expand the packing 34. It thus becomes necessary to keep the dimensions of the parts within close tolerances in manufacturing the same, while at the same time ample provision is made for the maintenance of a fluid tight seal between the cylinder and liner, and excessive wear on the packing due to relative movement between the liner and packing during operation of the pump is substantially eliminated.

In Figure 2 a slightly modified form of the invention is illustrated, wherein the inner junk ring 30 is formed with a longitudinally extending reduced portion 50, which is fitted into the cylinder beyond the bottom of the counterbore, whereby the inner junk ring is held against distortion or displacement, due to fluid pressure or other causes. In other respects the form of the invention illustrated in Figure 2 is substantially the same as that previously described, and operates in the same manner.

It will thus be seen that the invention, constructed as described above, provides a pump cylinder liner and packing assembly of simple design and rugged construction, which is easily assembled and disassembled, and in which the cylinder liner is rigidly held against longitudinal movement in the cylinder and wear on the packing is substantially reduced.

While the invention has been disclosed herein in connection with a specific embodiment of the same, it will be understood that this is intended by way of illustration only and that numerous changes can be made in the construction and arrangement of the various parts without departing from the spirit of the invention, or the scope of the appended claims.

Having thus clearly shown and described the invention, what is claimed as new and desired to secure by Letters Patent, is:

1. A pump liner assembly for pumps of the type having a cylinder and provided with an externally enlarged counterbore surrounding the cylinder at one end thereof comprising a tubular liner extending into the cylinder and having an external annular enlargement positioned in said counterbore and formed with an external annular projection disposed mediate its ends, inner and outer junk rings around the liner in the counterbore, on opposite sides of said enlargement, and whose inner circumferences are spaced radially inwardly of the outer periphery of said enlargement and radially outwardly from the exterior of the liner, said inner ring being engageable with the bottom of the counterbore to limit inward movement of said inner ring, and packing means around the enlargement between the projection and said rings in position to be expanded into sealing engagement with the enlargement and the surrounding wall of the counterbore.

2. A pump liner assembly for pumps of the type having a cylinder and provided with an externally enlarged counterbore surrounding the cylinder at one end thereof comprising a tubular liner extending into the cylinder and having an external annular enlargement positioned in said counterbore, an inner junk ring around the liner in engagement with the bottom of the counterbore and with the inner end of said enlargement, an outer junk ring around the liner in engagement with the outer end of the enlargement, the inner diameter of said rings being larger than the external diameter of the liner to provide clearance spaces between the inner circumferences of the rings and the exterior of the liner, packing means around the liner between said rings in position to be expanded into sealing engagement with the enlargement and the surrounding wall of the counterbore and means for applying a longitudinal force to said outer junk ring to hold the outer junk ring against movement away from said enlargement.

3. A pump liner assembly for pumps of the type having a cylinder and provided with an externally enlarged counterbore surrounding the cylinder at one end thereof comprising a tubular liner extending into the cylinder and having an external annular enlargement positioned in said counterbore and formed with an external annular projection mediate its ends, an inner junk ring around the liner positioned for engagement with the bottom of the counterbore and the inner end of said enlargement, an outer junk ring around the liner positioned for engagement with the outer end of said enlargement, the inner circumferences of said rings being spaced radially from the exterior of the liner to provide clearance space between the rings and liner, packing means in the counterbore surrounding said enlargement between said junk rings and said projection in position to be expanded into sealing engagement with the enlargement and the surrounding wall of the counterbore, and means for applying a longitudinal force to said outer junk ring to urge the outer junk ring toward the bottom of the counterbore.

References Cited in the file of this patent

UNITED STATES PATENTS

| | | |
|---|---|---|
| 1,449,541 | O'Brien | Mar. 27, 1923 |
| 1,510,042 | Clewett | Sept. 30, 1924 |
| 1,836,675 | Rick | Dec. 22, 1931 |
| 2,155,180 | Caldwell | Apr. 18, 1939 |
| 2,584,518 | Walton | Feb. 5, 1952 |
| 2,650,868 | Waldron | Sept. 1, 1953 |